(12) United States Patent
Azari et al.

(10) Patent No.: US 7,335,419 B2
(45) Date of Patent: Feb. 26, 2008

(54) SYSTEM AND METHOD FOR ENERGY-CONSERVING ROOFING

(76) Inventors: Shaun Azari, 435 Central Park West Apt. 4-O, New York, NY (US) 10025; Joshua J. Bierman, 435 Central Park West Apt. 3-B, New York, NY (US) 10025

( * ) Notice: Subject to any disclaimer, the term of this patent is extended or adjusted under 35 U.S.C. 154(b) by 455 days.

(21) Appl. No.: 10/488,655

(22) PCT Filed: Sep. 24, 2002

(86) PCT No.: PCT/US02/30201

§ 371 (c)(1),
(2), (4) Date: Nov. 16, 2004

(87) PCT Pub. No.: WO03/026883

PCT Pub. Date: Apr. 3, 2003

(65) Prior Publication Data

US 2005/0064175 A1 Mar. 24, 2005

Related U.S. Application Data

(60) Provisional application No. 60/324,409, filed on Sep. 24, 2001.

(51) Int. Cl.
*E04C 2/00* (2006.01)
*B32B 9/00* (2006.01)
(52) U.S. Cl. .................................. 428/411.1; 52/783.1
(58) Field of Classification Search ............... 52/171.3, 52/783.1, 788.1, 750; 361/226; 359/264; 428/411.1
See application file for complete search history.

(56) References Cited

U.S. PATENT DOCUMENTS

| 6,055,088 A * | 4/2000 | Fix et al. ..................... 359/265 |
| 6,084,702 A | 7/2000 | Byker et al. |
| 6,392,786 B1 * | 5/2002 | Albert ........................ 359/296 |
| 6,500,555 B1 | 12/2002 | Khaldi |

FOREIGN PATENT DOCUMENTS

DE 4321564 A1 * 1/1994

OTHER PUBLICATIONS

Cool colours NEWSCIENTIST.COM The World's No. 1 Science & Technology News Service published Jul. 19, 2006.
Preparation of Reversible Thermochromic Building Coatings and Their Properties; Yiping Ma, Beirong Zhu, Keru Wu; vol. 72, No. 911, Dec. 2000 pp. 67-71.

* cited by examiner

*Primary Examiner*—Ramsey Zacharia
(74) *Attorney, Agent, or Firm*—Ladas & Parry

(57) ABSTRACT

An energy-conserving building covering material includes a building panel, such as a roofing panel or siding panel, coated with a thermomorphic material that can change its energy reflectance. The thermomorphic coating material can be combined with a carrier material, or it can be encapsulated with a solvent and optionally a color former in a microcapsule suspended in the carrier material. Alternatively, the building panel can include an electrophoretic material sandwiched between two transparent panels acting as electrodes. The building panel, when covered with said coating material and carrier material combination, can reflect radiant energy during warmer temperatures and can absorb radiant energy during cooler temperatures and re-radiate said absorbed energy into an interior of a building.

5 Claims, 12 Drawing Sheets

FIG. 12 A
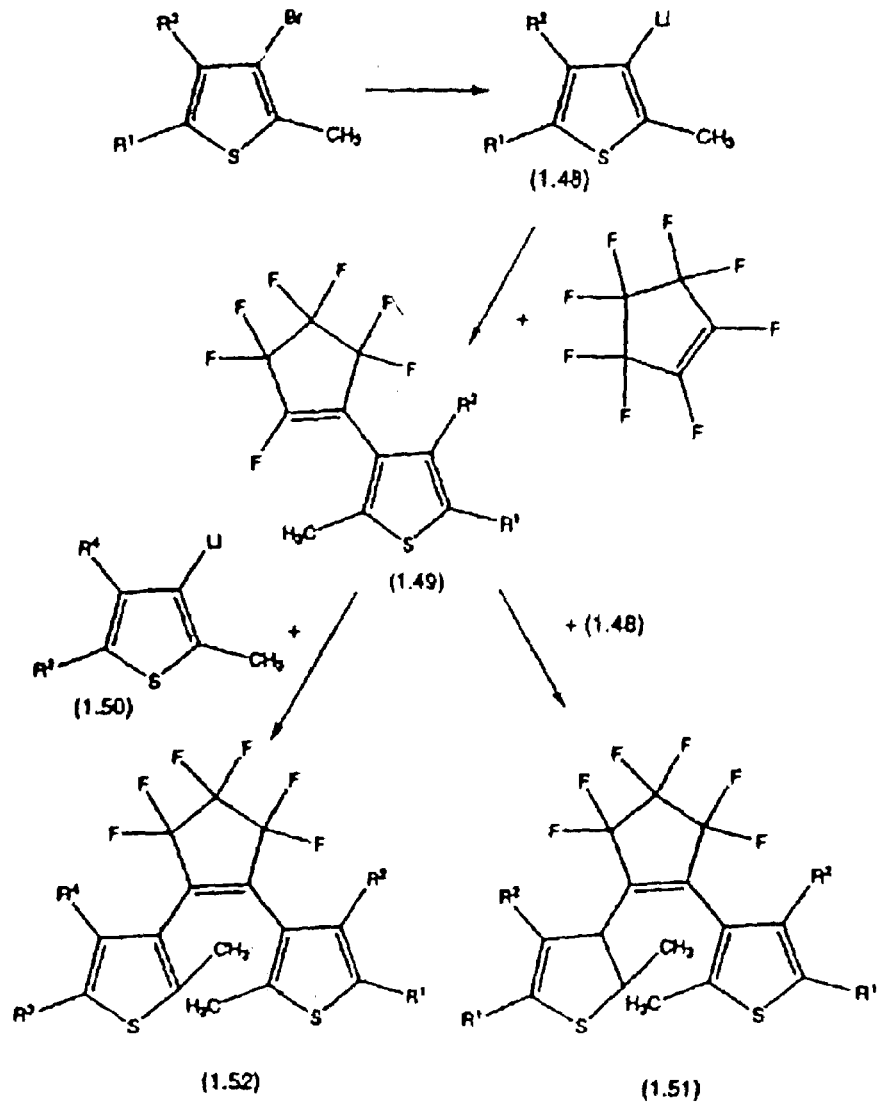
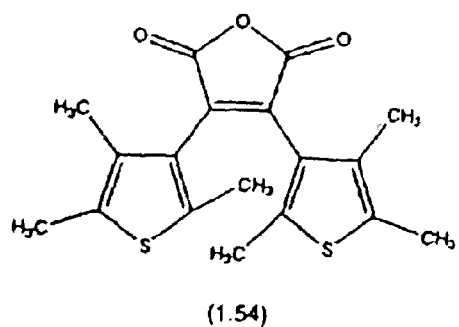
FIG. 12 B
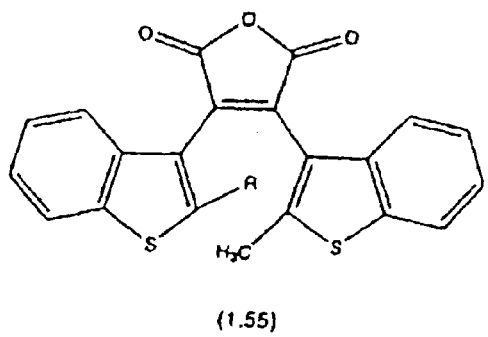
FIG. 12 C

Electric field between two parallel charged plates is uniform

SYSTEM AND METHOD FOR ENERGY-CONSERVING ROOFING

CROSS REFERENCE TO RELATED UNITED STATES APPLICATIONS

This application claims the benefit of "SYSTEM AND METHOD FOR ENERGY CONSERVING ROOFING", U.S. Provisional Patent Application No. 60/324,409, filed on Sep. 24, 2001 by Azari and Bierman, the contents of which are incorporated herein by reference.

FIELD OF THE INVENTION

This invention is directed to a roofing system that can change its energy reflectance based upon the outside temperature, or a manual control.

BACKGROUND OF THE INVENTION

White pigment on roof surfaces has been shown to generate interior temperatures that are as low as fourteen degrees (Fahrenheit) below temperatures sampled in buildings with dark roofs; it also has been shown to lower roof temperatures by up to seventy degrees (Fahrenheit), thereby extending the surface's useful life. Such white roofs are called "cool roofs". While having a cool roof is beneficial to buildings during warm weather, it has obvious repercussions during cooler weather.

In a 1998 study, scientists at Lawrence Berkeley Laboratory in Berkeley, Calif., concluded that residents and businesses in the New York City area could cut their summertime air-conditioning costs by $22 million by swapping dark roofs with more reflective ones. Outdoor summer temperatures could also drop a couple of degrees. See, e.g., "Cooling Energy Savings Potential of Light-Colored Roofs for Residential and Commercial Buildings in 11 U.S. Metropolitan Areas", S. Konopacki, H. Akbari, M. Pommerantz, S. Gabersek, and L. Gartland, Laurence Berkeley Laboratory, Environmental Energy Technologies Division Report, May. 1997; "Simulated Impact of Roof Surface Solar Absorptance, Attic, and Duct Insulation on Cooling and Heating Energy Use in Single-Family New Residential Buildings", S. Konopacki and H. Akbari, Laurence Berkeley Laboratory, Environmental Energy Technologies Division Report, October 1998. On the other hand, the reflective roofs would raise heating bills by $6 million in winter. Hot roofs are preferable in wintertime. See "Scientists Watch Cities Make Their Own Weather", Kenneth Chang, New York Times, Aug. 15$^{th}$, 2000. As an example, FIG. 1 depicts an infra-red (IR) photo of a roof, of which the top part is coated and the bottom part is not. The coloration of the photo indicate that white coating reduced the roof temperature by about 40° C. (70° F.). See "Projects of the Heat Island Group: Demonstration of Energy Savings of Cool Roofs", http://eetd.lbl.gov/HeatIsland/PROJECTS/DEMO/.

While the notion of enjoying the benefits of a white roof (or "cool roof") has been accepted and applied for many years, there is no technology in the market that allows buildings to capture the value of cool roofs during warm weather without losing value during colder weather. Thus, within the American market, cool roofs are widely used throughout regions that do not experience dramatic variances in temperature, such as the extreme southern regions of the United States. However, most areas of the country cannot afford to take advantage of cool roofs because of the consequences that would be incurred during colder months.

Consequently, there is a need for a roofing system that can change its energy reflectance based on the outdoor temperature. For example, FIG. 2 depicts a graph showing the potential net energy savings from changing roof reflectivity. Savings are measured in dollars. Note that the net savings are the savings of cooling energy use less the penalties of heating energy use.

SUMMARY OF THE INVENTION

The answer to this problem is to have a roof that changes color to complement the outdoor temperature. A roof with this property shall be referred to herein as a thermochromic roof, or more generally, as a thermomorphic roof, as there are several mechanisms that can cause a material to change color or reflectance based on temperature. A thermomorphic roofing material would do away with heat loss in the winter, making a reflective roof a more economically feasible option throughout the United States.

In one embodiment, a thermomorphic coating can be applied to existing roofing surfaces. The coating can have a white or light color during warm weather and a black or dark color in cooler weather.

Thermnomorphic materials have been used for quite some time. They are relatively cheap, and manufacturing facilities are abundant. They are processed to alternate between virtually any (two) colors, and can be triggered at almost any "target" temperature. The transition is achieved by changing the exact chemical make up of the thermomorphic portion of the pigment. The pigment can be manufactured in microencapsulated form.

The material being encapsulated dictates the exact method of microencapsulation because microencapsulation serves as a barrier between the thermomorphic system and any chemicals around it, such as the paint base. If the thermomorphic system is intrinsically thermochromic or photochromic, as explained below, all it needs to be encapsulated with is a buffer. However, if the encapsulated material is ionochromic, that is, a material that changes color upon interaction with an ionic species, as explained herein below, then it needs to be mixed in the microcapsule with a color developer, such as a phenolic material, and a non-polar co-solvent medium in addition to the color former. The co-solvent medium is typically a low melting point, long chain alkyl compound. The microencapsulated pigment is then added to a chosen medium—such as a coating—and a thermomorphic product is born.

A thermomorphic coating can be calibrated at the site of manufacture for each target climate. Each calibration would change color according at a predetermined optimal temperature. The fine-tuning of such a calibration is done through the choice of color developer and co-solvent used in microencapsulation. The temperature at which the material will change color is largely set by the melting point of the co-solvent. This is recognized and trusted process that is adopted by a number of existing manufacturers in different industries with different applications.

The thermomorphic material can be added, in microencapsulated form, to spray on roofing. In this manner the entire roof, in one application, with no extra work, can become thermomorphic.

Alternatively, shingles can be factory coated with a thermomorphic coating for use on new residential, steep slope roofs, or anywhere a shingle is required. The thermomorphic shingle can be an asphalt shingle, a plastic shingle, or just about any kind of shingle that can be painted. The shingle can be coated at the factory with thermochromic paint, and can be applied at the construction site exactly like a regular shingle. There are a whole host of materials that can be coated in the factory with thermomorphic paint for use in building construction. Shingles are merely the first.

A third embodiment of the present invention involves an electrophoretic panel. Electrophoretic panels can provide a roofing material that has the same energy saving effects as the thermomorphic coated materials, but without the added cost of an overlay (coating). Electrophoretic sheets can be laid down as the top layer of the roofing system. The electrophoretic sheets are comprised of two pieces of electrically conductive plastic with a clear colloid between them. Those plastic sheets make electrophoretic sheets very durable and water resistant. The sheets can be cut to any size, including the size of a shingle.

Electrophoretic panels can facilitate manual control of a roof's color transition from dark to light or vice-versa. Alternatively, if connected to a thermostat, the panels can become part of a building's existing heating/air-conditioning scheme. This can translate into even more substantial savings in energy costs. Electrophoretic sheets require very little power to prompt the transition, and do not demand any power to maintain it. Electrophoretic sheets can be as automatic as thermochromic coating, but retain the ability to be overridden manually.

Unlike thermomorphically coated materials, electrophoretic sheets do not need a specific pre-determined temperature at which the color change is set to occur. Thus, there is no need to tailor the product to different climates at the time of manufacture.

Each embodiment of the invention will yield lower energy expenditure in both cold and hot weather. In addition to saving energy, the roofing system of the present invention will provide improved comfort, will lower costs, and will reduce air pollution.

Comparison studies have shown that cool roofs are an effective means of lowering roof maintenance costs. See a "Cool Coatings Heat Up Savings", Lisa M. Gartland, Maintenance Solutions, January 1999. These findings provide evidence that cool roofs extend the usable life of a roof surface. For example, after ten years, a conventional roof typically requires a new layer of roofing while a thermochromically coated roof will likely require only a new application of coating. Moreover, like prevailing cool coating alternatives, thermochromic paint can be expected to slow the aging process of underlying roofing materials.

Similarly, by increasing the useful life of roofing materials, thermochromic roofs can reduce the amount of roofing waste generated. See id. Currently, there are approximately 11 million tons of asphalt roofing waste going into landfills every year. Id.

Finally, the thermomorphic products can reduce air pollution. First, because less cooling/heating will be needed for a given structure, fewer emissions will be produced in energy generation. Second, cooler surfaces transfer less heat to the air, keeping urban temperatures lower, in turn reducing smog formation. (S. Konopacki et. al., Laurence Berkeley Laboratory, Environmental Energy Technologies Division Report, May 1997 and October 1998)

BRIEF DESCRIPTION OF THE DRAWINGS

FIG. 12A shows a synthetic route to symmetrical and non-symmetrical dithiophenylperflurorocyclopentenes;
FIGS. 12B and 12C depict the structure of respective dithiophenylperfluorocyclopentenes.

DETAILED DESCRIPTION OF THE INVENTION

1. Thermochromic Coatings

A thermochromic coating is a coating that changes color in response to heat. At a specific temperature point a thermochromic material will change its color, that is, the wavelengths of light that it absorbs and reflects. The actual mechanism used to change color varies depending upon the material in question. There are several different methods for achieving the desired thermochromic effect. Each method has specific environmental and application specifications and involves different materials.

Intrinsically Thermochromic Materials

Some materials are intrinsically thermochromic and are therefore very easy to use in a coating. Cholesteric liquid crystals, a supra-molecular system, are among the most commonly used intrinsically thermochromic materials because of their ability to change color at low temperatures.

Figure 1:
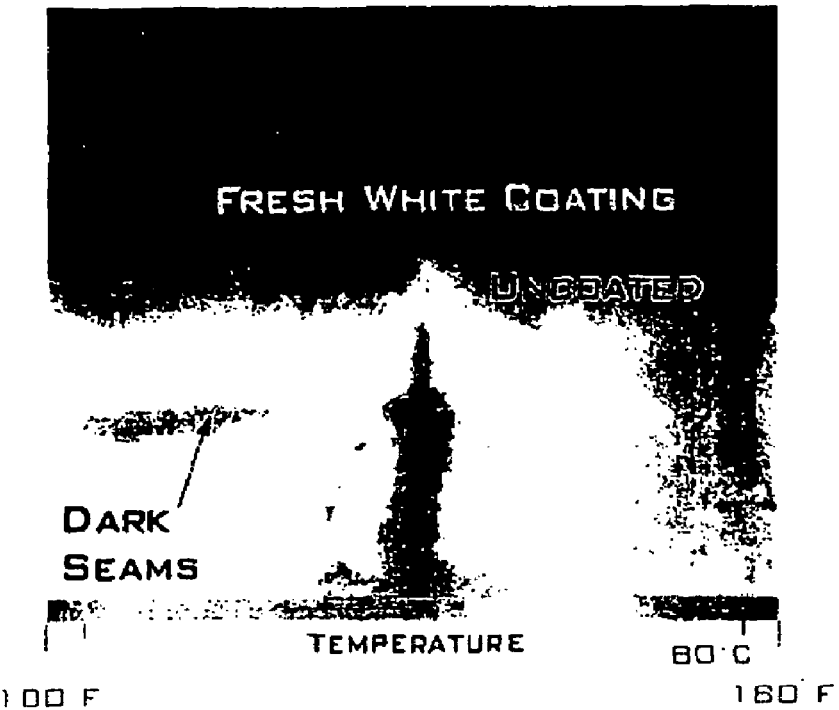
FIG. 1 shows an infra-red photo of a roof.
Figure 2:
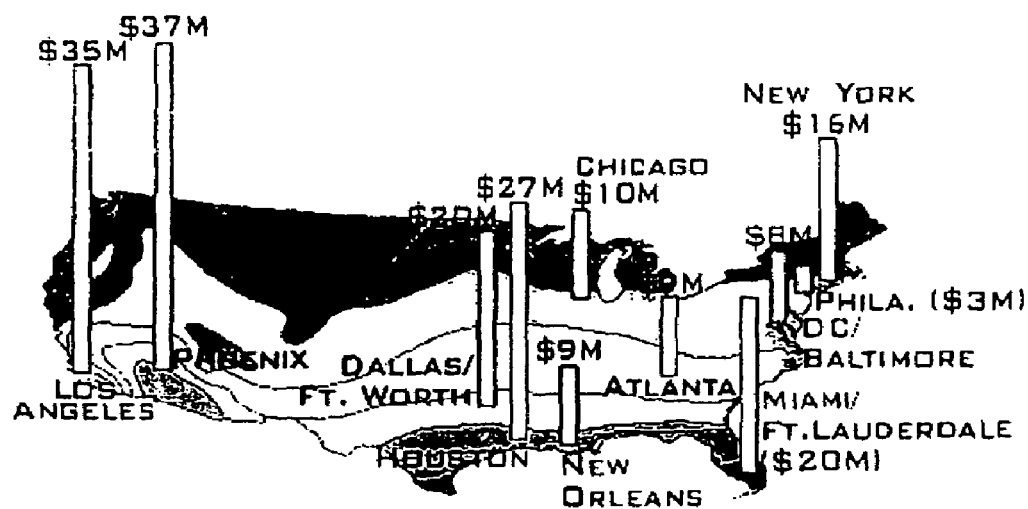
FIG. 2 depicts a graph showing the potential net energy savings from changing roof reflectivity.
Figure 3:
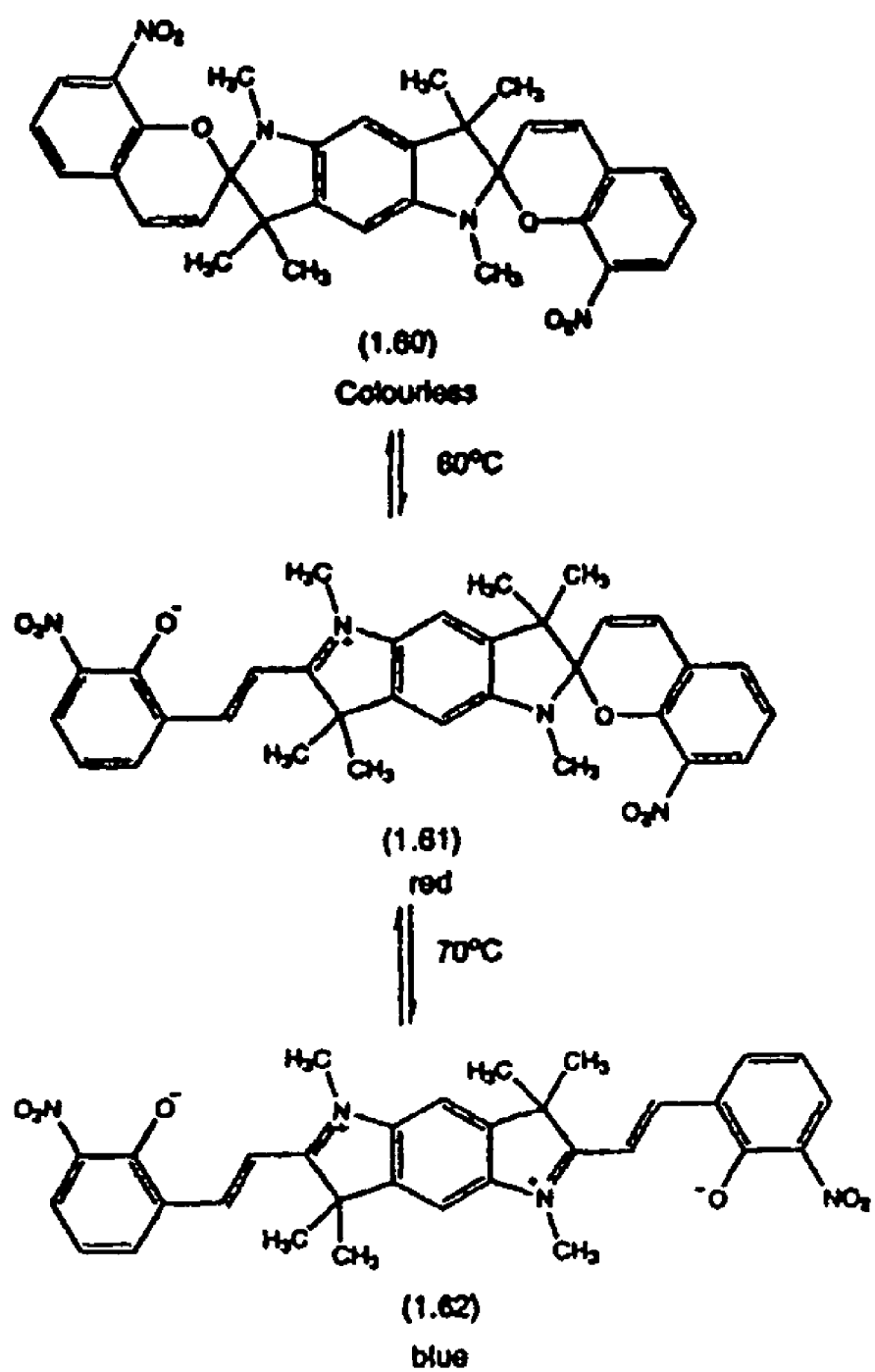
FIG. 3 depicts the structure of a spirooxazine.
Figure 4:
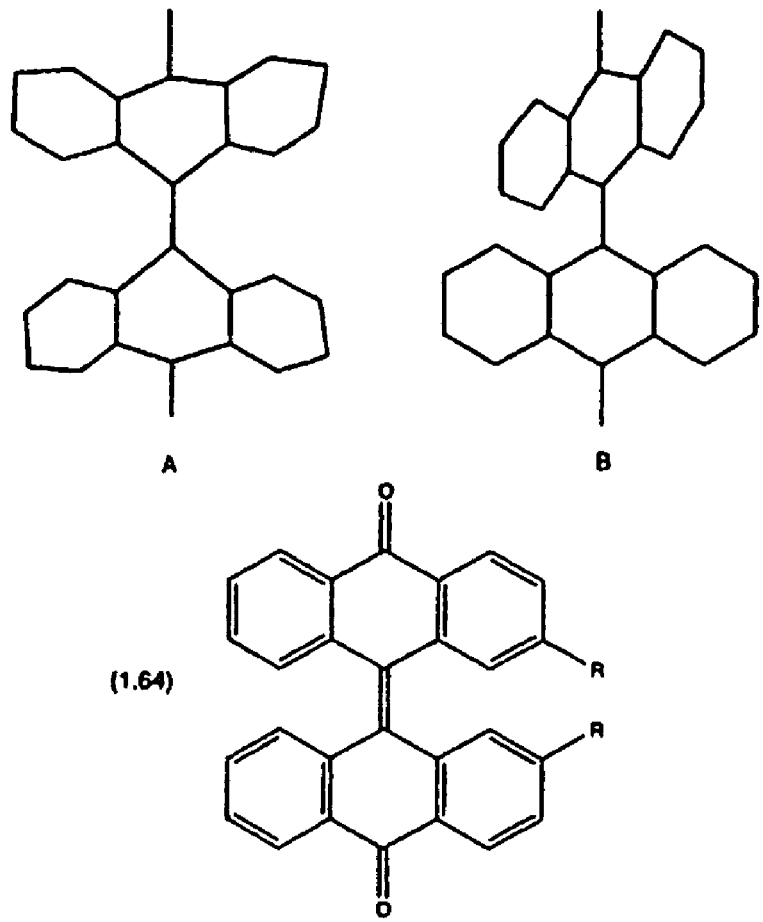
FIG. 4 depicts the structure of a typical stereoisomer.
Figure 5:
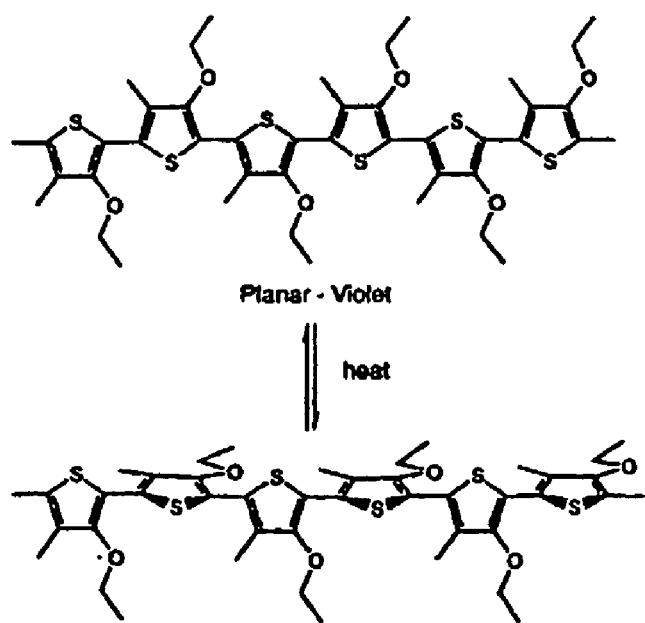
FIG. 5 depicts the structure of a polythiophene.
Figure 6:
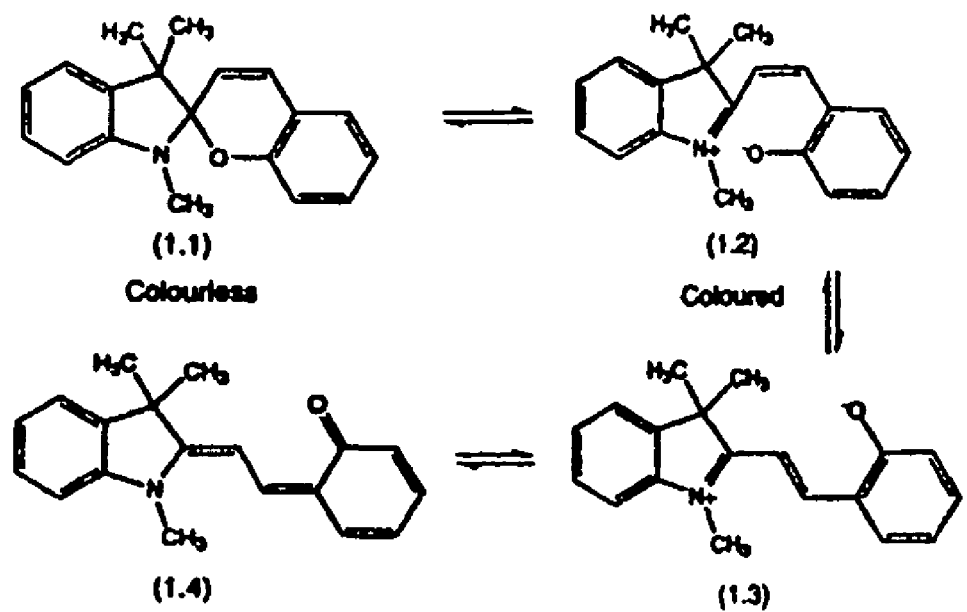
FIG. 6 depicts the structure of a spironaphthoxazine.
Figure 7:
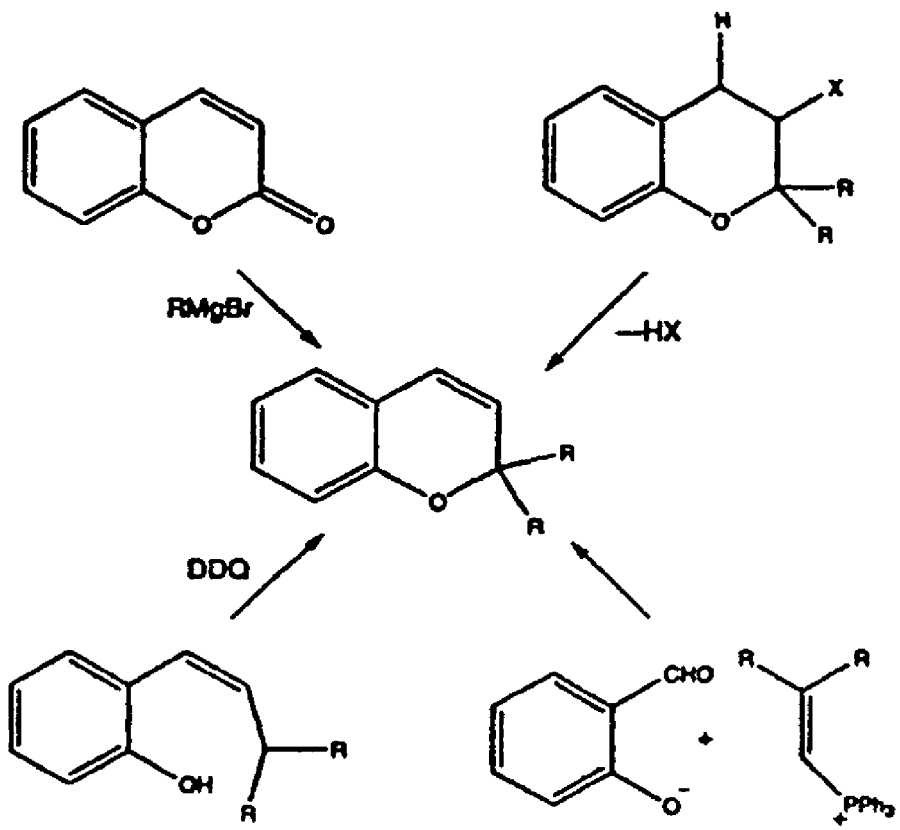
FIG. 7 depicts the structure of a benzopyran.
Figure 8:
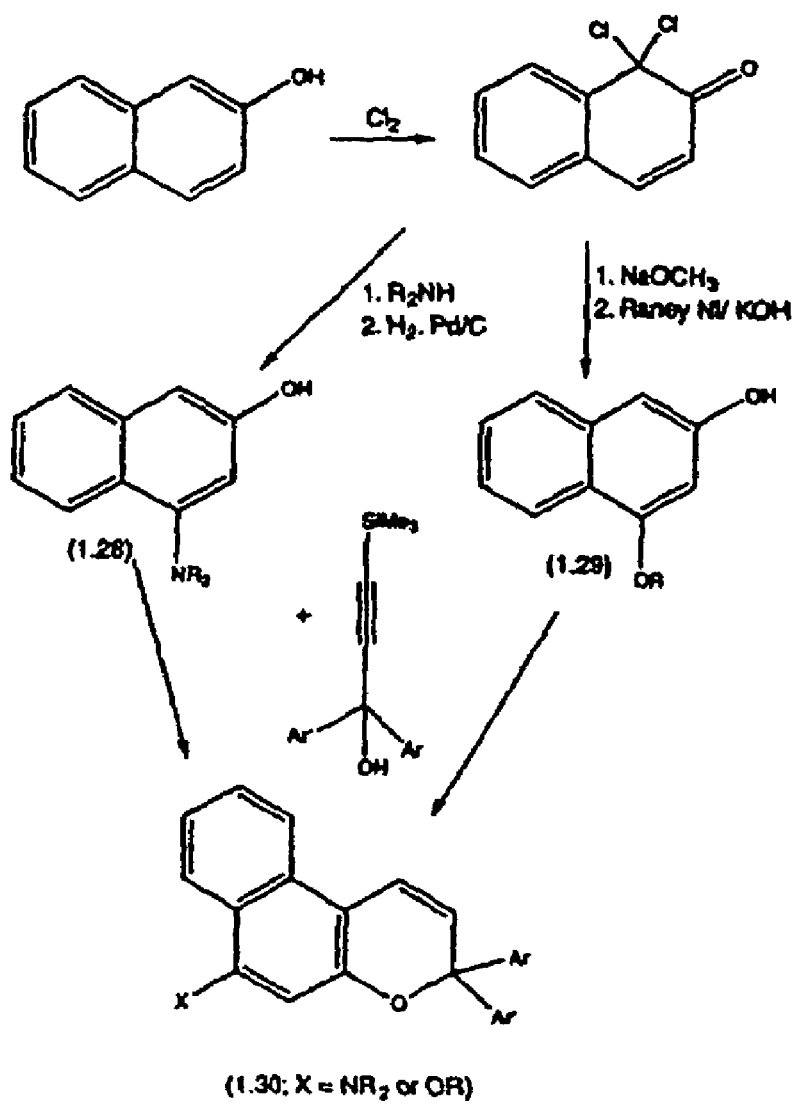
FIG. 8 depicts the structure of a naphthopyran.
Figure 9:
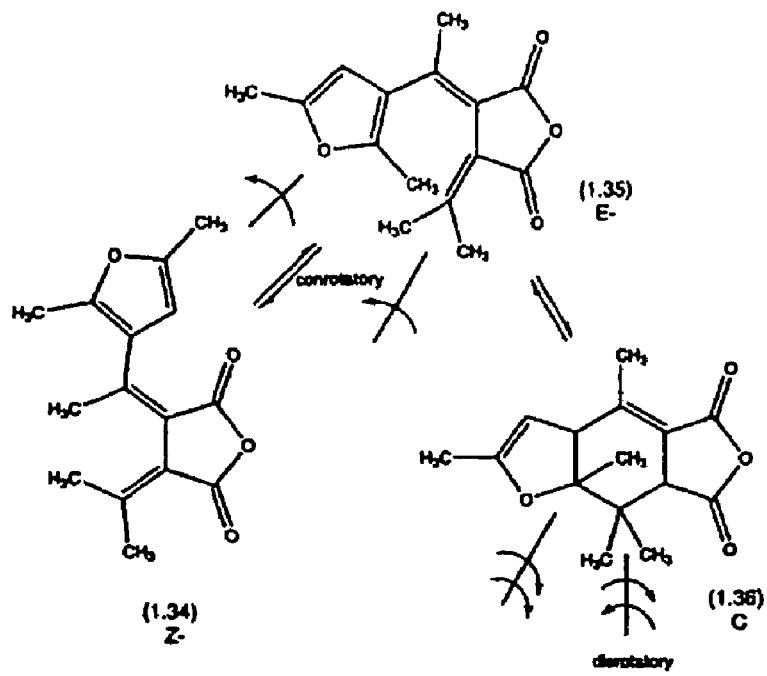
FIG. 9 depicts the structure of a fulgide.
Figure 10:
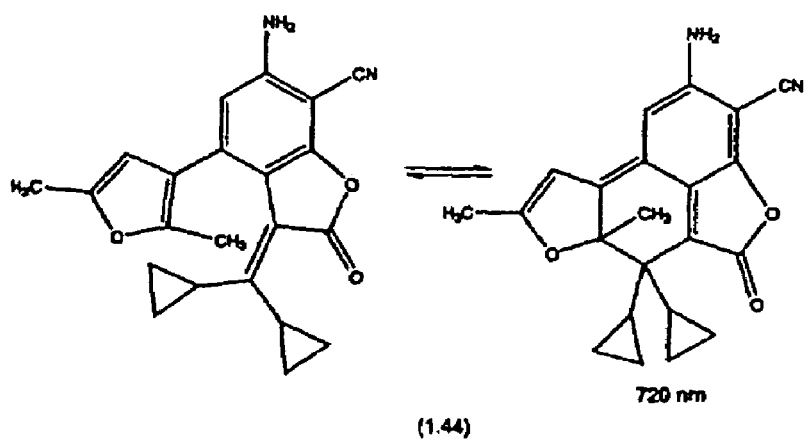
FIG. 10 depicts the structure of a diarylethene.
Figure 10:
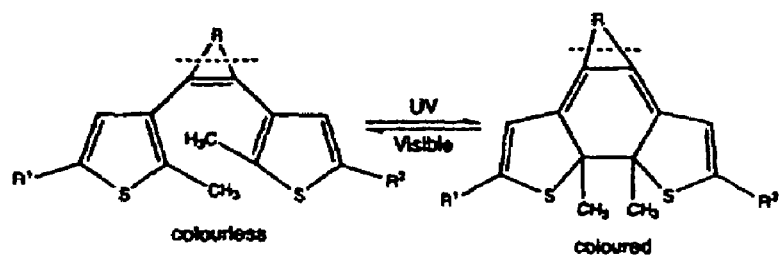
Figure 10:
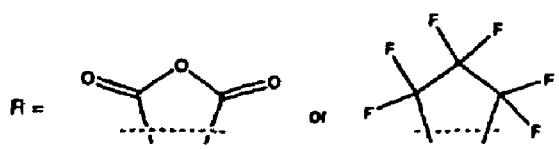
Figure 11:
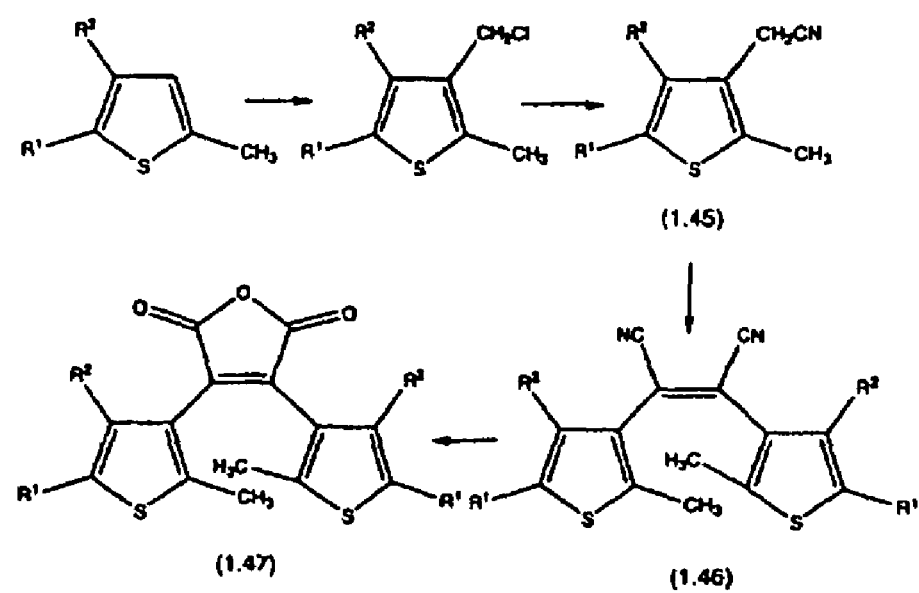
FIG. 11 depicts the structure of a diheteroarylethene.

All that would be required is to add such materials to a carrier that does not chemically interact with them, thus preserving their thermochromic properties. Any colorless paint or coating suitable for application to buildings or roofs can serve as such a carrier. Alternatively, they can be microencapsulated so that there is a buffer between the thermochromic material and the paint/coating. The transition temperature at which an intrinsically thermochromic material changes state from reflecting to absorbing is an intrinsic property of the compound, and is not altered by mixing with the carrier material. A short list of some intrinsically thermochromic material families and some specific materials, listed below family names, is as follows:

a. Spirooxazines (see FIG. 3)
  b. Compounds exhibiting stereoisomerism (see FIG. 4)
    i. Biathrylidenes
      1. Bianthrones
    ii. Bithioanthylidene
    iii. Mixed Bianthrylidenes
      1. xanthylideneanthrone
    iv. dixanthylidenes c. Polythiophenes (see FIG. 5)
d. Polysilanes
e. Polydiacetylene
f. Macromolecular Systems
   i. Polythiophenes
   ii. Polysilanes
   iii. polydiacetylene Photochromic Materials Photochromism is a chemical process in which a compound undergoes a reversible change between two states having separate absorption spectra, i.e. different colors. The change in one direction occurs under the influence of electromagnetic radiation, usually ultraviolet (UV) radiation, and in the other direction by altering or removing the light source or alternatively by thermal means. Photochromic materials can be used for creating a coating that will change color in the desired thermochromic fashion, but some small technical work-a-rounds must be used. One type of workaround involves using a heat sensitive UV blocker. Such a blocker loses its effectiveness as becomes hotter, thus blocking less UV radiation. A second mechanism involves a material that darkens upon exposure to UV radiation. After this material heats up, it lightens in color. When the temperature drops again, the UV blocker becomes active and the ensuing lack of UV radiation causes the photochromic material to return to a dark colored state so that it begins absorbing heat. There are many photochromic materials, almost all of which can be modified in one way or another to exhibit the properties needed for this application. For instance, one group of chemicals known as spiroindolinonaphthoxazines change color upon exposure to UV light, which happens each and every time the sun rises. This group of chemicals changes back on either the removal of the UV light source (sundown) or heating to change point (hot summer day) and in that manner can be used as an additive to paint or coatings for use as a thermochromic coating on a roof. A short sampling of photochromic material families, along with a few example materials, is as follows:

a) Spironaphthoxazines (see FIG. 6)
   a. Spiroindolinonaphthoxazines
   b. Spiroindolinopyridobenzoxazines
b) Benzopyrans (see FIG. 7)
c) Naphthopyrans (see FIG. 8)
   a. Diarylnaphthopyrans
d) Fulgides (see FIG. 9)
e) Diarylethenes (see FIG. 10)
   a. Diheteroarylethenes (see FIG. 11)
f) Dihydroindolizines
g) Dithiophenylperfluorocyclopentenes (see FIG. 12)
h) Spirobenzopyrans Ioniochromic Materials Ionochromism is the name applied to the phenomenon of a color change associated with the interaction of compounds or materials with an ionic species. Usually that species is a solvated hydrogen ion. Other commonly used ions are metal ions and omnium cations such as tertiary ammonium and phosphonium.

Ionochromic materials are very important for the purpose of creating thermochromic coatings. This is because the color change is controlled by the presence or absence of ions that can be provided by raising or lowering the pH of the environment. Control of the local pH can be obtained through the use of any number of materials that melt at the required temperature, releasing ions into the local environment. A good example of this is crystal violet lactone.

Figure 13:
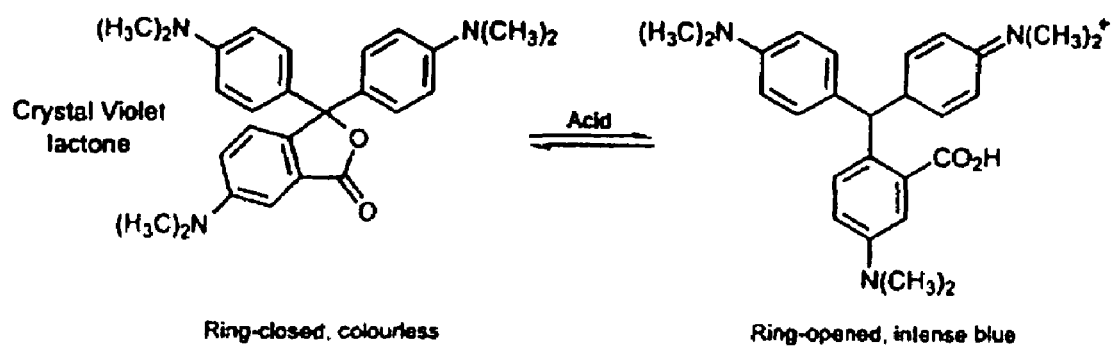
FIG. 13 depicts the structure of a crystal violet lactone.

Obtaining thermochromic properties from crystal violet lactone requires the combined use of three components: (1) a color former, (2) an acidic color developer, such as a phenolic material, and (3) a non-polar co-solvent medium, such as a long-chain alkyl compound, that will control the interaction between the first two ingredients of the formulation. When the components are heated and mixed together in the correct proportions so that the color former and developer are dissolved in the co-solvent and the solution is then cooled, the solid composite formed is intensely colored. When that material is heated past the melting point of the co-solvent the pH level is changed and the crystal violet lactone goes to a ring closed position. This makes the material colorless. FIG. 13 depicts the structure of crystal violet lactone, and shows that acid is used to change the pH, and cause the change in color.

Figure 14:
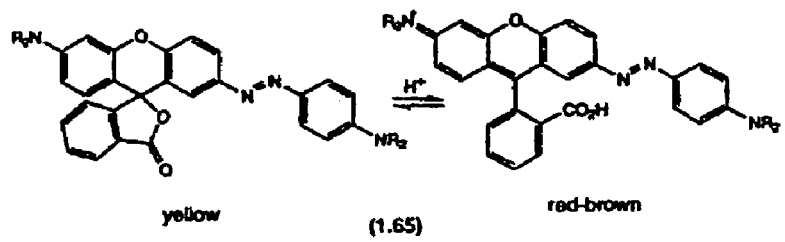
FIG. 14 depicts the structure of an azo dye.
Figure 15:
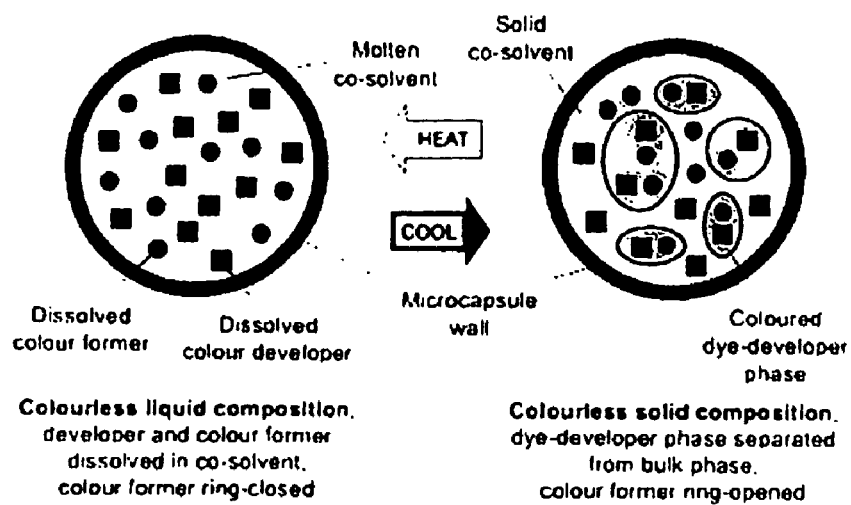
FIG. 15 depicts a microencapsulated thermochromic system.

This formula will be added, in microencapsulated form, to off-the-shelf paint and coating products, rendering them "thermochromic". The material will be calibrated at the site of manufacture for each climate individually and, for each calibration, will change color according to a predetermined temperature. The transition temperature at which the ionochromic material changes from absorbing to reflecting is determined by the melting point of the co-solvent. FIG. 14 shows an example of a microencapsulated thermochromic system.

Figure 16:
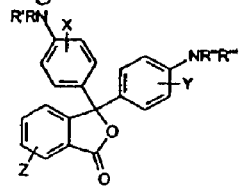
FIG. 16 depicts the structure of a phthalein
Figure 17:
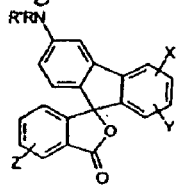
FIGS. 17 and 18 depict variations in the structure of a flourene.
Figure 18:
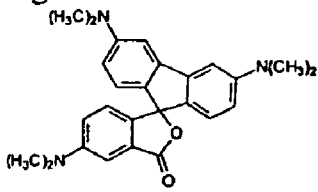
Figure 19:
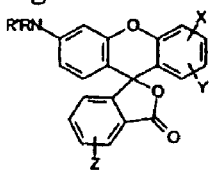
FIGS. 19 and 20 depict variations in the structure of a flouran.
Figure 20:
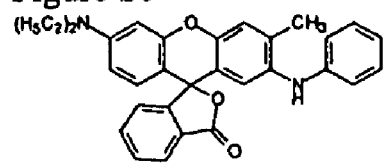
Figure 21:
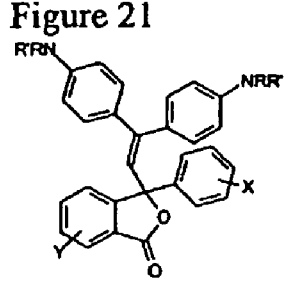
FIGS. 21 and 22 depict structural variations of a diarylphthalide.
Figure 22:
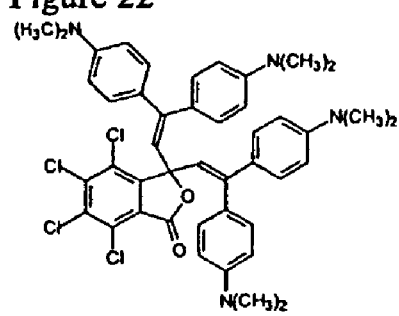
Figure 23:
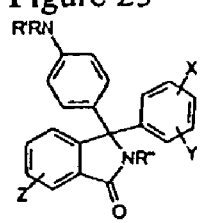
FIGS. 23 and 24 depict structural variations of a lactam.
Figure 24:
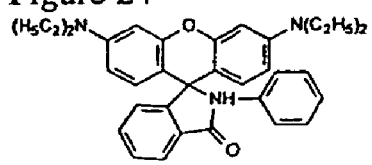
Figure 25:
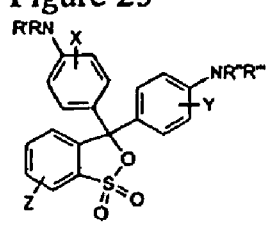
FIG. 25 depicts the general structure of a sulfone.

There are a large number of ionochromic materials and material families from which to choose appropriate chemicals. Almost all of them can be used, depending on climate and color needs. The following is a list of representative ionochromic material families and a few example materials:

a) Phthalides
   a. Phthaleins (see FIG. 16)
      i. Phenolphthalein
      ii. Crystal Violet Lactone (see FIG. 13)
      iii. Pyridyl Blue
   b. Sulfophthaleins
b) Leucotriarylmethanes
c) Azo Dyes (see FIG. 14)
d) Styryl Dyes
e) Chelates
   a. Dimethylglyoxime
   b. 1,2-Dihydoxybenzenes
   c. 1-hydroxyanthraquinones
f) Crown Ethers
g) Mono- and di-vinylphthalides
   a. Diarylphthalides
      i. general structure of a monovinylphthalide (see FIG. 21)
      ii. divinylphthalide which is green but strongly absorbs in near IR (see FIG. 22)
      iii. Fluorene
         1. Green, IR-absorbing; versions of diarylphthalides with direct bonding between aryl rings (see FIG. 17)
         2. green with absorbance tailing into IR when ring-opened (see FIG. 18)
      iv. Fluorans
         1. Yellow, orange, pink/violet through to green oxygen bridged versions of diarylphthatides can be designed to give neutral colors, e.g. black. (see FIG. 19), e.g. fluoran which is almost a neutral black when ring-opened (see FIG. 20)

h) Lactams
   a. contains lactam (cyclic amide) ring used instead of lactone (cyclic ester).
      i. general analogues of diarylphthalide (see FIG. 23)
      ii. xanthene-derived lactam, which is magenta when ring opened is (see FIG. 24)
   i) Sulfones
      a. a sulphur analogue of the lactone-type.
         i. General structure: (see FIG. 25)

All three of the aforementioned materials can be generally referred to as thermomorphic materials. The microencapsulated thermomorphic material can be used to create a paint/coating that goes from one color to another (white to black, yellow to blue, dark purple to light pink, etc.) or from colored to colorless (blue to clear, black to clear, green to clear, etc.) which would then be painted over a reflective coating that would become visible at high temperatures when the thermomorphic material has gone colorless, thereby reflecting heat. The technology for microencapsulation is well known as are materials utilized in their manufacture.

Thermomorphic-microencapsulated materials can be used in coatings geared towards roof construction. These coatings can be used both in the factory and on the construction site. In the factory the materials can be sprayed on or used directly in the creation of roofing shingles, tiles, and mats. In this manner the roofing materials will gain the thermochromic properties of the coating with fewer impurities and less man-hours of work. On the construction site the thermomorphic coating can be applied, like a normal paint to existing roofing surfaces.

Many of the thermomorphic materials described above are sensitive to UV radiation and can loose their effectiveness upon sustained exposure to UV radiation. Thus, even though some of these materials need UV sensitivity to trigger the transition from absorbing to reflecting and vice-versa, some measure of UV protection is useful in extending the lifetime of these materials. Compounds that can absorb UV radiation are well known in the art. See, for example, the compounds disclosed in U.S. Pat. Nos. 5,705,146 and 6,084,118, and in the references cited therein.

2. Electrophoretic Panels

Electrophoresis is the migration of charged molecules, such as proteins or dye chemicals, within an electrical field. The separation of proteins in an electric field is based on the size, shape, and charge.

Figure 26:
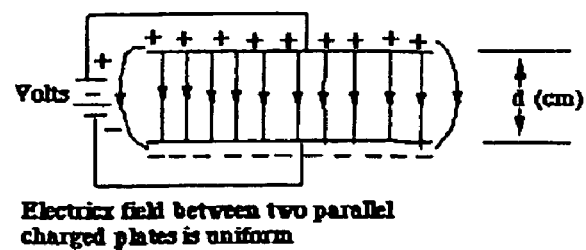
FIG. 26 depicts an electric field between two charged plates

Electrophoresis originates as a laboratory method for obtaining information about proteins and other molecules. To obtain a uniform electric field with a constant magnitude and direction over a specified volume of space, two flat metal plates are set up parallel to each other as shown in the figure below. When the terminals of a power source with voltage V are connected to these plates, a uniform electric field E is produced between the plates, as indicated in the FIG. 26.

Most electrophoretic methods use a supporting media, such as starch, paper, polycrylamide, or Agarose. The term "zone electrophoresis" refers to electrophoresis that is carried out in a supporting medium, whereas "moving-boundary electrophoresis" is carried out entirely in a liquid phase.

The roofing system of the present invention can be based on moving-boundary electrophoresis. As opposed to using proteins or other heterogeneous particles, homogenous particles that uniformly move at the same rate and distance under a given charge can be used. In so doing, light-colored, negatively charged particles can be encapsulated in a dark opaque medium. When combined with colorless/clear electrodes replacing the metal plates, a shift in color is achieved.

More specifically, when the particles are at the bottom of the medium, the dark medium occludes them, and results in the appearance of a uniform dark surface. When the charge is reversed, the particles collectively rise to the top, allowing them to reflect light before it is absorbed by the dark medium. This results in the appearance of a uniform light or white colored surface.

Figure 27:
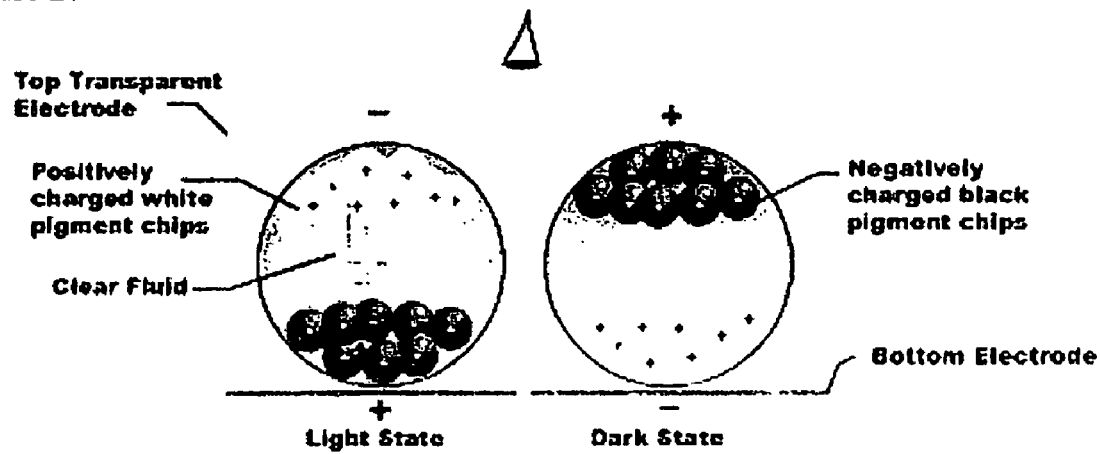
FIG. 27 depicts an example of an electrophoretic cell.

Alternatively, similar results can be achieved by using two groups of oppositely charged particles in a clear medium. If the negatively charged particles are dark in color and the positively charged particles are light in color, the positively charged particles will climb to the top and the negatively charged ones will fall to the bottom when a negative charge is applied to the top of the encapsulation. The result will be a light-colored surface. If the charge were reversed, the negatively charged particles will climb to the top, resulting in a uniformly dark surface, as shown in FIG. 27.

Electrophoretic mats can be applied to roofing materials to produce panels. This can be done by directly bonding the electrophoretic material to backing paper through the use of an adhesive. These panels will only change color in response to a small electric charge or pulse. The pulse will be delivered via a single wire connected to each mat, and run underneath the mat to a central point. The panels will be connected to an electric thermostat, via the central wiring point, which will deliver a charge whenever the temperature exceeds a predetermined threshold. This will in turn alter the color from absorbent (dark) to reflective (white) or vice-versa. This threshold temperature can be set independently of the installation or manufacture of the panels. It is also worthy to note that the roof can be easily separated into zones that can change at different "trigger" temperatures; similarly, the roof's color can be changed manually at the owner's discretion.

3. Electrochromic Materials

When an electroactive species undergoes a change in color upon electron transfer or oxidation/reduction, the process is known as electrochromism. This process normally involves the passage of an electric current or potential and is reversible. During the process of coloration in electrochromic cells by passing a charge in one direction, a color can form in one or both of the electrodes or in the electrolyte adjacent to the electrodes. When the color is formed by reduction at a negative electrode it is called cathodic coloration and, conversely, at the anode it is anodic coloration.

The most common is the colored electrode type, in which the transparent electrodes are coated with an organic or inorganic polymer, which becomes colored on passing a charge through the cell. If both electrodes change color they must display complementary electrochromism: the color change that occurs by oxidation at the first electrode must be the same as that occurring by reduction at the second electrode. The degree of coloration can be controlled by the amount of charge passing through the cell. The cell is bi-stable; i.e. it remains colored, even in the absence of applied voltage, until an equal charge is passed in the opposite direction through the cell. In other words the coloration of the electrochromic cell is controllable and switchable on demand.

In the case of the colored electrolyte type, the two complementary electrochromes are dissolved in the electrolyte between the transparent electrodes. One becomes colored by oxidation and the other by reduction and consequently the electrolyte becomes colored. The electrolyte remains colored only while a current is being passed, becoming colorless once the charge is removed.

Electrochromes can be classified into three groups. In the first type the coloring species remain in solution; in the second type the reactants are in solution but the colored product is a solid; the third type are those where all the materials are solids. In solution electrochrome systems, as opposed to solution-solid or solid systems, the soluble electrochrome undergoes an electron transfer interaction on the surface of the appropriate electrode, involving either anodic oxidation or cathodic reduction, where it changes color and then returns back to the solution phase, i.e. a colored electrolyte is produced. A solution-solid electrochromes in its pale or colorless state is soluble in the electrolyte. However, on electron transfer, the colored form of the electrochrome that is produced is insoluble and is deposited onto the surface of an electrode. All inorganic electrochromes exist in the solid state in both the colorless and colored states, e.g. Prussian Blue and tungsten trioxide. Conducting polymers such as polyanilines, polypyrroles and polythiophenes also fall into this class of electrochromes.

Electrochromic materials pose a special opportunity. Their properties make them perfect as a possible replacement for the electrophoretic materials. Like the electrophoretic materials, these materials do not require a constant charge to maintain the color change. The same basic setup, that of clear plastic electrodes sandwiching the electrochromic materials, with the electrodes connected to a thermostat, could be used. Depending on cost this could be a better choice. As with electrophoretic panels, a thermostat threshold temperature can be set independently of the installation or manufacture of the electrochromic panels.

Although the thermomorphic materials described herein have been described in the context of roofing materials, it will be apparent to those skilled in the art that these same materials can also be adapted for use as wall coverings or building siding materials. The invention is defined by the appended claims.

What is claimed is:

1. A building material comprising an electrophoretic material sandwiched between two conducting plates that function as electrodes, each of said conducting plates having a top surface and a bottom surface, said conducting plates being connected to a thermostat set to a threshold temperature, wherein said thermostat responds to said threshold temperature by sending an electric signal to said conducting plates to induce a state transition in said electrophoretic material.

2. The building material of claim 1, wherein said electrophoretic material includes an energy reflecting state and an energy absorbing state.

3. The building material of claim 2, wherein said electrophoretic medium comprises light colored particles suspended in a dark opaque medium, such that in the energy absorbing state the light colored particles are hidden by the dark opaque medium, and in the energy reflecting state the light colored particles are displacing the dark opaque medium.

4. The building material of claim 2, wherein said electrophoretic medium comprises a group of light colored particles, and a group of oppositely charged dark colored particles, such that in the energy absorbing state the dark colored particles are disposed on the top surface to absorb radiant energy, and in the energy reflecting state the light colored particles are disposed on the top surface to reflect radiant energy.

5. A method of conserving energy in a building, comprising the step of covering the walls or roof of the building with the building material as claimed in claim 1.

\* \* \* \* \*